United States Patent [19]

Carr

[11] 4,223,432

[45] Sep. 23, 1980

[54] SHIM BUNDLE AND METHOD OF MAKING THE SAME

[75] Inventor: Charles E. Carr, Olympia, Wash.

[73] Assignee: Carr Cedar Products, Inc., Shelton, Wash.

[21] Appl. No.: 953,960

[22] Filed: Oct. 23, 1978

[51] Int. Cl.$^3$ .............................................. B23P 17/00

[52] U.S. Cl. .......................................... 29/417; 100/6; 144/192; 144/326 R; 206/323

[58] Field of Search .................. 206/321, 323; 144/13, 144/192, 326 R; 83/920; 29/412, 413, 414, 417; 100/6

[56] References Cited

U.S. PATENT DOCUMENTS

| | | | |
|---|---|---|---|
| 48,913 | 7/1865 | Dennis | 144/189 |
| 255,621 | 3/1882 | Hargreaves | 144/189 |
| 964,548 | 7/1910 | Pinching | 144/192 |

*Primary Examiner*—Lowell A. Larson

*Attorney, Agent, or Firm*—Robert W. Beach; Ward Brown

[57] ABSTRACT

Several courses of random width, low-grade tapered wood shingles are stacked in an elongated trough with the butts of shingles of adjacent courses disposed at opposite sides of the trough to form a substantially continuous stacked shingle lay-up. A cutoff saw consecutively cuts loose packs of shingles from an end portion of the lay-up. After each pack-cutting operation, the lay-up is shifted lengthwise of the trough to a position for the saw to cut another pack from the lay-up. Each severed pack is banded about its center to form a bundle, moved lengthwise partway through a gang saw to form a set of parallel kerfs spaced apart uniformly widthwise of the bundle and extending from an end of the bundle almost up to the band and then turned end-for-end and moved lengthwise partway through the gang saw to form another set of kerfs extending from the other end of the bundle almost up to the band. The kerfs of the two sets of kerfs are in registration. In use, the bundle band is severed and the kerfed shingles may be separated into narrow individual builder's shims by breaking the short shingle portions between oppositely extending registered kerfs.

11 Claims, 9 Drawing Figures

2

Fig. 6
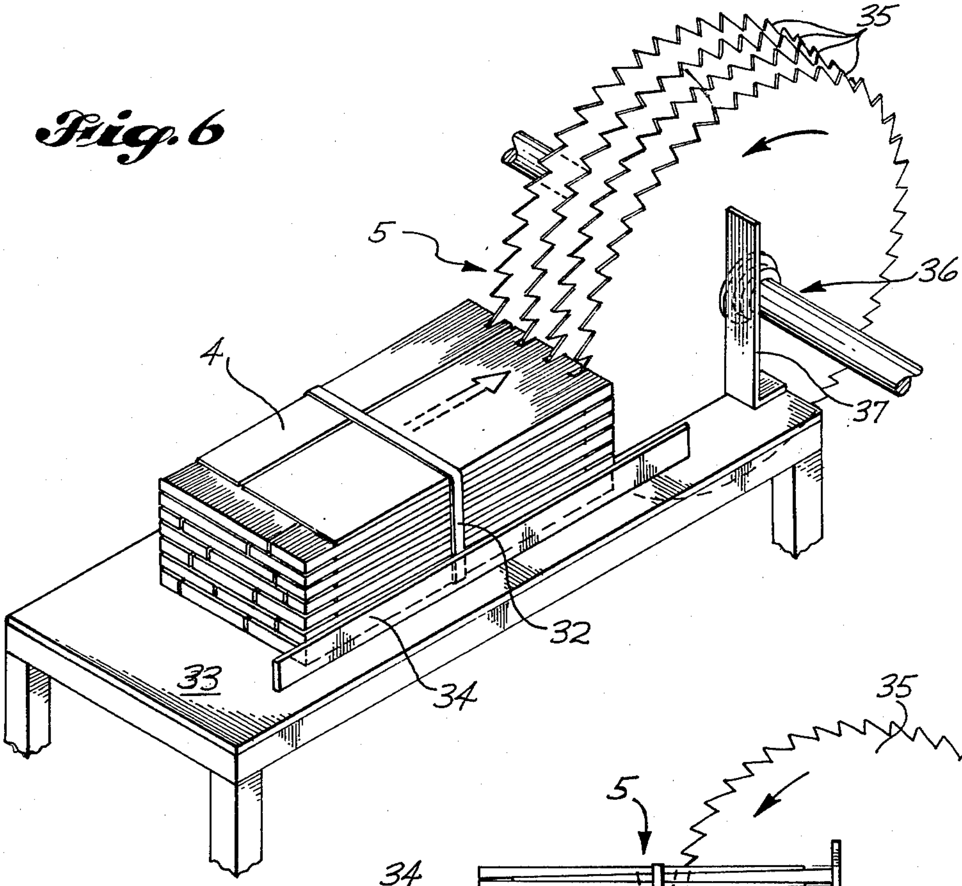
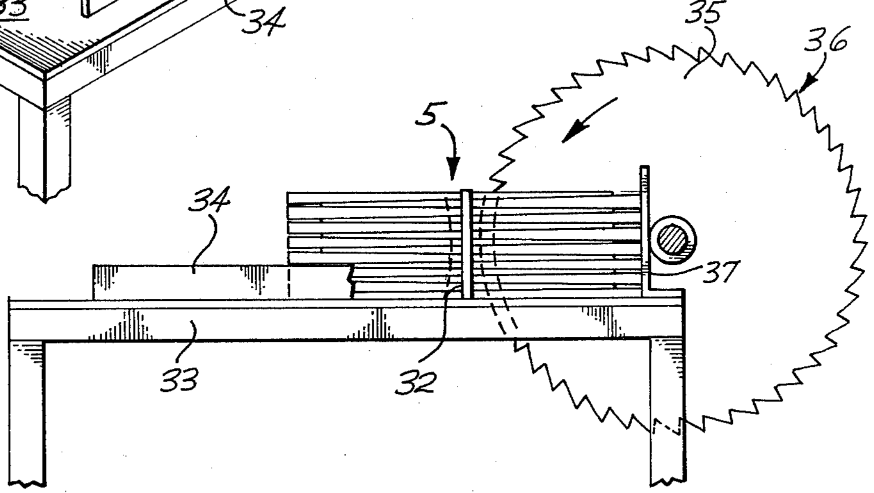
Fig. 7
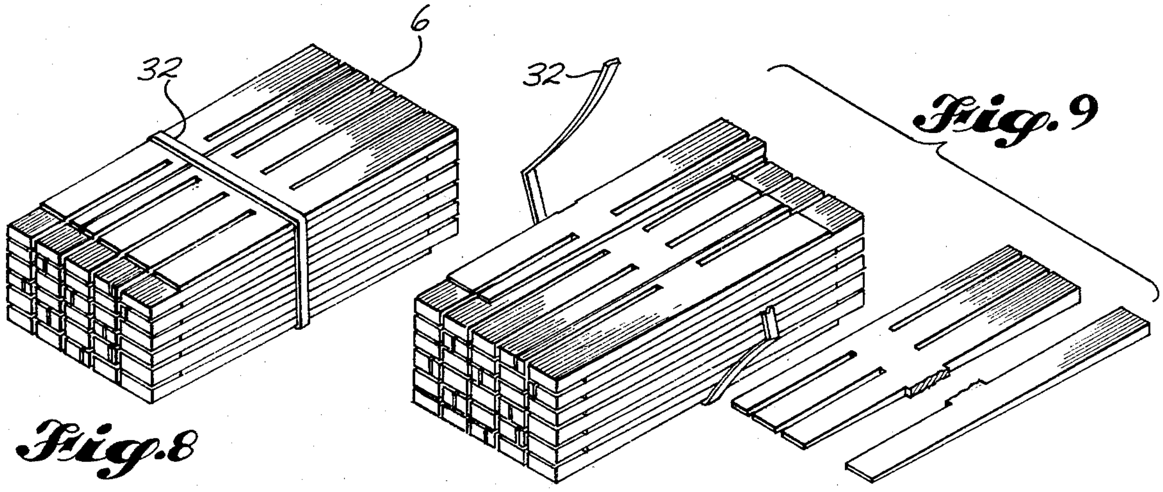
Fig. 9
Fig. 8

SHIM BUNDLE AND METHOD OF MAKING THE SAME

BACKGROUND OF THE INVENTION

1. Field of the Invention

The present invention relates to a bundle of shim stock pieces banded about its center and having respective sets of kerfs extending inward from the respective opposite ends of the bundle almost up to the central band such that individual shims may be broken from the shim stock pieces, and also to a method for manufacturing such a bundle.

2. Prior Art

There are many uses in building construction for narrow tapered strips commonly known as builder's shims or simply shims. For example, such shims are used to fill gaps between a frame, such as a door or window frame, and an opening for receiving the frame, so that the frame is not distorted when nails are driven through it to install it in the opening. Also, shims often are used in raising a building component to a desired elevation, as when it is desired to level the sills of a structure by raising portions of the sills away from a stationary foundation.

It is customary to cut or split builder's shims from wood shim stock pieces tapered lengthwise of the grain. For example, low-grade shingles may be purchased solely to be cut or split into narrow shims, or higher grade waste shingles or shingle pieces left over after a roof has been installed may be cut or split into shims.

It is known to provide prepackaged bundles of separate shims precut from tapered shim stock pieces such as low-grade shingles. Up to now such bundles have been manufactured by cutting individual shim stock pieces into shims of desired width, such as by running shingles separately through a gang saw, and gathering and packaging a desired number of the individual shims. While the cost of the shim stock pieces is quite low, there is substantial time and expense associated with cutting each shim stock piece individually, and particularly with gathering and packaging the individual precut shims.

SUMMARY OF THE INVENTION

The principal object of the present invention is to reduce the costs associated with providing builder's shims.

In accordance with the principal object, an object of the present invention is to provide a shim bundle, and a method for manufacturing such a bundle, in a form eliminating the need for severing individual shims from tapered shim stock pieces as a shim bundle is manufactured.

The foregoing objects can be accomplished by manufacturing a bundle of shims by stacking shim stock pieces or blanks to form a substantially continuous lay-up having several courses of shim stock pieces, cutting a loose pack of shim stock pieces from an end portion of the lay-up, banding the severed shim stock pack transversely of its length to form a bundle, and forming kerfs extending lengthwise of the bundle almost up to the band and spaced apart widthwise of the bundle a distance equal to the desired width of the shims.

In the preferred embodiment of the invention, tapered wood shingles are stacked in a trough to form a multicourse lay-up with the butts of shingles of adjacent courses disposed at opposite sides of the trough. The lay-up is shifted incrementally lengthwise of the trough past a cutoff saw which, after each increment of shift, cuts a loose pack from the leading end of the lay-up. Such pack is banded about its center to form a bundle and a set of parallel kerfs extending from one end of the bundle almost up to the band is cut by running the bundle lengthwise partway through a gang saw. The bundle then is swung end-for-end and a second set of a parallel kerfs extending from the other end of the bundle almost up to the band is cut by again running the bundle lengthwise partway through the gang saw such that the kerfs of the two sets are registered.

The resulting shim bundle includes several courses of shingles, each shingle having registered kerfs extending from opposite ends of such shingle and separated only by a short central joining portion of a length slightly greater than the width of the band. Individual shims may be separated from such a kerfed shingle by manually breaking the joining portions between registered kerfs.

BRIEF DESCRIPTON OF THE DRAWINGS

FIG. 6 is a somewhat diagrammatic fragmentary top perspective of another component of apparatus used in performing the method of the present invention, namely, a gang saw.

FIG. 7 is a fragmentary side elevation of the component of FIG. 6.

FIG. 8 is a top perspective of a shim bundle in accordance with the present invention, and FIG. 9 is a corresponding top perspective of such bundle with its band severed and a tapered shim stock piece kerfed in accordance with the present invention separated from the bundle.

DETAILED DESCRIPTION

By use of the method of the present invention, banded bundles of builder's shims are formed from individual shim stock pieces or blanks. Preferably such shim stock pieces are low-grade, such as No. 4 grade, random width cedar shingles. However, shim stock pieces of other woods or other materials could be used. The wood shim stock pieces are tapered lengthwise of the grain so that a short longitudinal section of a piece may be split or broken easily. Similarly, if shim stock pieces of a material other than wood are used, such material should be tearable or somewhat brittle so that at least a short longitudinal section may be torn or broken easily.

Figure 2:
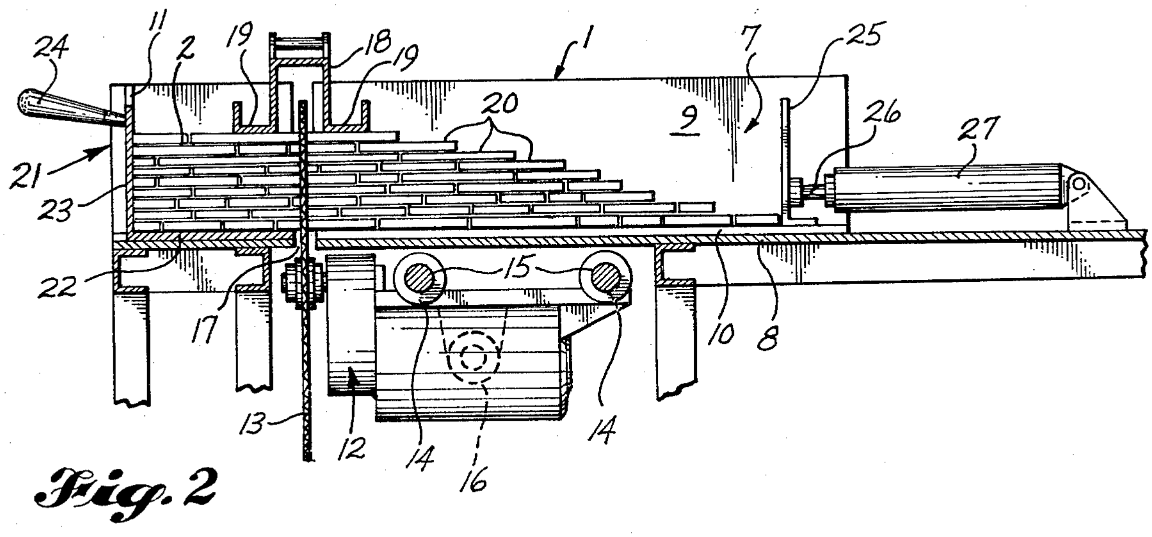
FIG. 2 is a fragmentary longitudinal vertical section of the component of FIG. 1.
Figure 3:
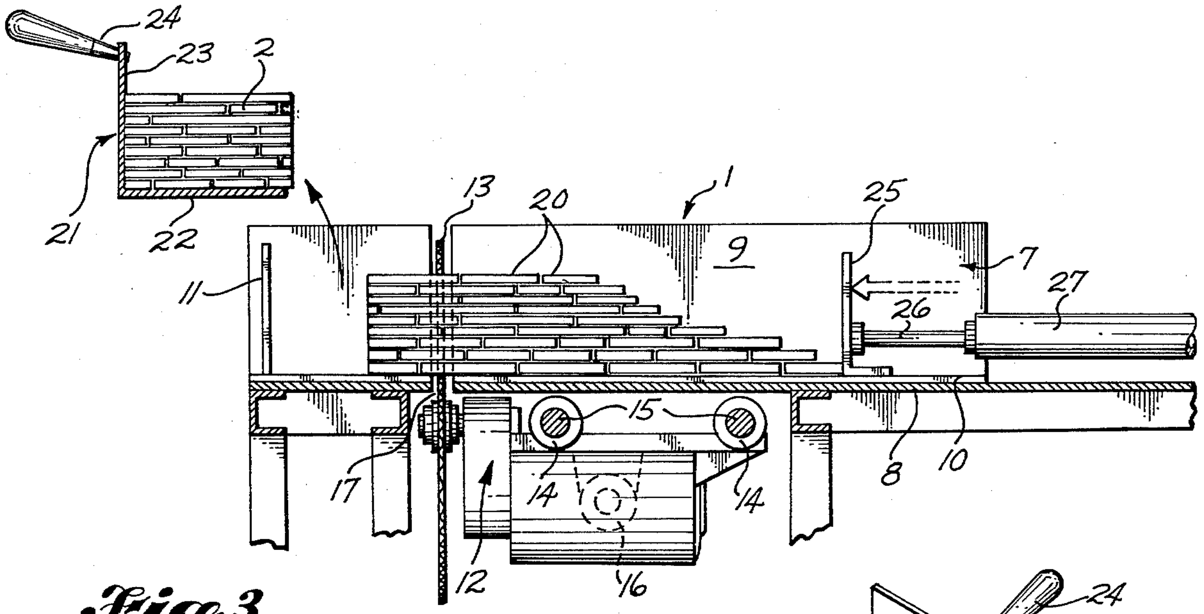
FIG. 3 is a somewhat diagrammatic corresponding longitudinal vertical section with parts in different positions showing a severed shim stock pack in accordance with the present invention being removed from such component.
Figure 4:
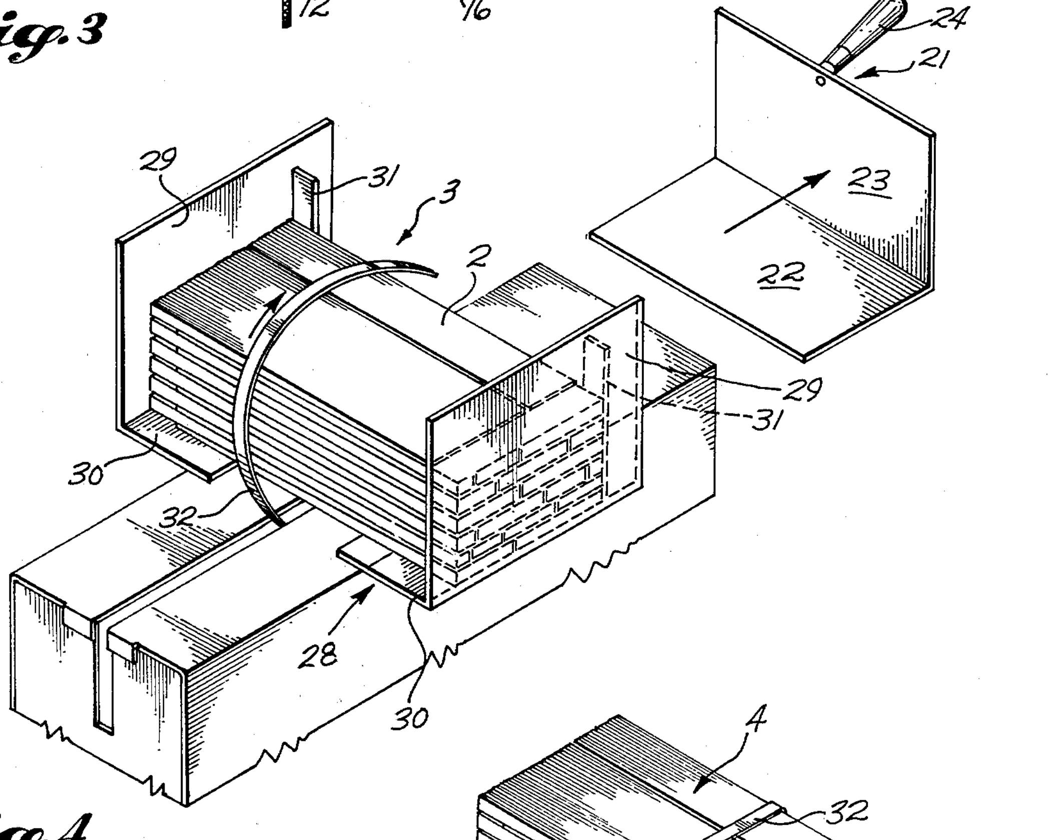
FIG. 4 is a somewhat diagrammatic fragmentary top perspective of another component of apparatus used in performing the method of the present invention, namely, a bander.
Figure 5:
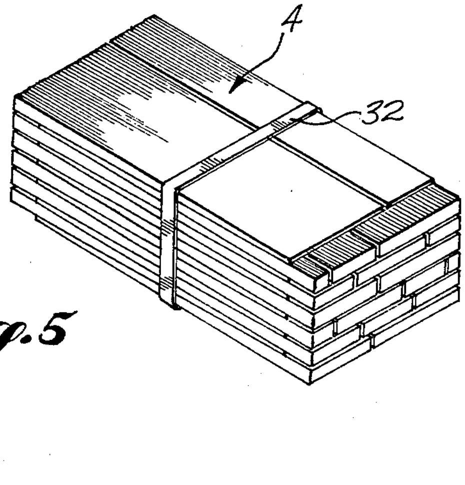
FIG. 5 is a top perspective of a partly manufactured shim bundle in accordance with the present invention after it has been removed from the component of FIG. 4.

Apparatus for performing the preferred embodiment of the method of the present invention includes three manufacturing components. Shim stock pieces are stacked in courses in a pack-forming component 1, shown in FIGS. 1, 2 and 3, to form an elongated lay-up of shim stock pieces from which a loose pack 2, shown toward the left of FIGS. 2 and 3, is severed. A banding component 3, shown in FIG. 4, is used to band such pack to form a bundle, such as bundle 4 shown in FIG. 5. A bundle-kerfing component 5, shown in FIGS. 6 and 7, completes the shim bundle manufacturing operation by forming sets of registered kerfs extending inward from the bundle ends, such as in the kerfed bundle 6 shown in FIG. 8. As seen in FIG. 9, when it is desired to use shims, the band of the completed bundle is severed and the longitudinal sections between registered kerfs are broken to form individual shims.

The first manufacturing component 1 includes a lay-up trough 7 including a bed 8 and opposite upright sidewalls 9. A spacer flange 10 projects inward from the bottom of each sidewall over the bed and a vertical stop flange 11 projects inward from each sidewall at one end, the "leading" end, of the trough.

A cutoff saw 12 having a rotary ripping blade 13 disposed in a vertical plane is mounted to move transversely of the length of the trough by annular bearings 14 encircling horizontal rods 15 which extend laterally beneath the trough bed. Projection of the plunger of a double-acting hydraulic jack 16 moves the cutoff saw across the lay-up trough so that the upper portion of saw blade 13 travels through a lateral slot 17 in the trough sidewalls 9, spacer flanges 4 and bed 8. A saw guard 18 having hold-down channels 19 located, respectively, at opposite sides of slot 17 is swingably mounted on a trough sidewall 9 to swing between the raised, generally upright position of FIG. 1 and the lowered, generally horizontal position of FIG. 2.

To begin the method of the present invention, courses of shim stock pieces, such as low-grade random width cedar shingles 20, are stacked in trough 1 to form an elongated lay-up of shim stock pieces. Each shingle is substantially shorter than the distance between the trough sidewalls and extends generally widthwise of the trough. The butt of each shingle of the bottom course is placed against one trough sidewall and the tip of such shingle rests on the spacer flange 10 of the other sidewall. Consequently, the bottom shingle course is spaced from the trough bed a distance equal to the thickness of the spacer flanges.

The butts of the shingles of the second course engage the sidewall opposite the sidewall engaged by the butts of the shingles of the first course. As the lay-up forming process is continued, the leading edges of the leading shingles are placed in engagement with the vertical stop flanges 11 so that a planar leading end is formed by the leading edges of the several courses. The lay-up sides, formed by the butts of shingles of alternate courses, also are planar.

After a lay-up of shim stock pieces having a desired number of courses has been formed in the trough, the shingle stacker swings saw guard 18 downward so that its hold-down plates formed by the webs of channels 19 engage the upper surface of the top course of the lay-up. Cutoff saw 12 is moved widthwise of the lay-up by projection of the plunger of hydraulic jack 16 and the upper portion of saw blade 13 cuts a loose pack 2 of stacked shingles from the leading end of the lay-up as the blade moves through the lateral trough slot 17.

Figure 1:
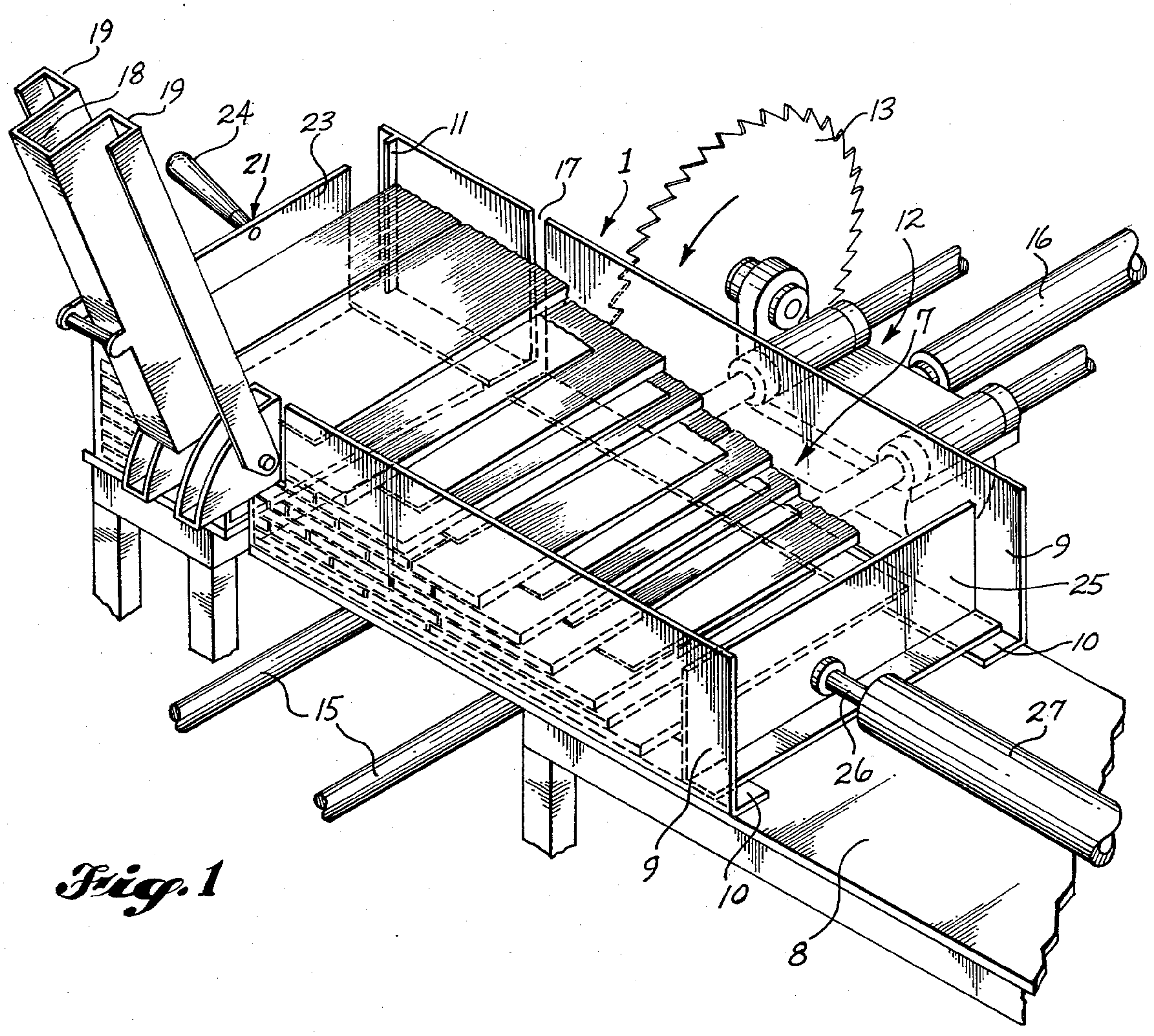
FIG. 1 is a fragmentary top perspective of one component of apparatus used in performing the method of the present invention, namely, a lay-up trough and a cutoff saw movable transversely of the length of such trough.

After the stacker swings the guard into its retracted position, such as the raised position shown in FIG. 1, the severed pack can be removed from the trough by use of a scoop 21. The horizontal bottom plate 22 of the scoop is of a width less than the distance between the inner edges of spacer flanges 4 to fit between such flanges and of a thickness equal to or less than the thickness of the spacer flanges to fit beneath the bottom course of the severed pack. An upright end wall 23 projects upward from bottom plate 22 and a handle 24 projects from the upper portion of such end wall oppositely from the bottom plate.

As shown in FIG. 3, after the severed pack 2 has been removed by the use of scoop 21, the remainder of the stacked shingle lay-up is shifted lengthwise of the trough to project into the space from which the severed pack has been removed, such as by an upright pusher plate 25 carried at the outer end of the plunger 26 of a hydraulic jack 27 engaging the adjacent edge of the bottom course of shingles. Such jack extends generally lengthwise of the trough and is mounted toward the trailing end of the trough.

The lay-up shifting is continued until the newly formed leading end of the lay-up engages the trough stop flanges 11. Guard 18 again is swung downward, cutoff saw 12 again is moved widthwise of the trough to cut another pack of stacked shingles from the forward end portion of the lay-up and such pack is removed from the trough by use of scoop 21. Meanwhile, after the pusher plate plunger 26 has been retracted, additional shingles are stacked at the trailing end of the lay-up. In this manner successive loose packs of shingles are cut from the leading end portion of the continuous shingle lay-up at short intervals.

The next manufacturing component of apparatus for performing the present invention is a banding machine, such as bander 3 shown in FIG. 4, which may be an automatic bander such as Signode bander or strapper No. MCD 700. A cradle 28 including parallel sidewalls 29 spaced apart a distance slightly greater than the lengths of packs cut in the pack-forming component is mounted on the bander by bottom flanges 30 projecting inward from sidewalls 29 and secured to the upper surface of the bander. Aligned vertical stop flanges 31 project inward from corresponding ends of the cradle sidewalls such that a loose pack carried by scoop 21 may be set in the cradle and the scoop removed as shown diagrammatically in FIG. 4. The cradle is positioned such that the bander applies a band 32 transversely of the length of the pack generally centrally between its ends to form a shingle bundle 4 shown in FIG. 5.

Each banded bundle is moved from the banding machine to the third component of apparatus for performing the method of the present invention, namely, a kerf cutter. As shown in FIGS. 6 and 7, the preferred kerf cutter 5 includes a table 33 having an upright guide flange 34 located at one side of and parallel to the several uniformly spaced rotary blades 35 of a gang saw 36.

An upright side of the bundle is placed against guide flange 34 and the bundle is moved lengthwise partway through the gang saw until the leading end of the bundle engages a stop 37 projecting upward from the table. Stop 37 is positioned such that the uniformly spaced upright kerfs cut by the gang saw blades extend from the leading end of the bundle almost to the bundle band 32. The bundle is removed from the gang saw, swung end-for-end, placed with its opposite side in engagement with the guide flange 34 and again moved lengthwise partway through the gang saw such that a second set of kerfs extending from the opposite bundle end almost to the band are cut with its kerfs in registration lengthwise of the bundle with the kerfs of the first set of kerfs.

The completed kerfed bundle of shingles is shown in FIG. 8. It includes freshly cut upright sides formed by the upright longitudinal edges of the bundle courses, planar ends formed by the butts of shingles of alternate courses and several registered kerfs extending lengthwise of the bundle from the opposite bundle ends, respectively, almost to the band and spaced uniformly widthwise of the bundle. As shown in FIG. 9, the bundle band may be severed, kerfed shingles removed and individual shims separated from a shingle by manually breaking or splitting the small joining sections between registered kerfs.

I claim:

1. The method of forming a bundle of shims which comprises, in sequence:

(1) stacking shim stock pieces to form a shim stock lay-up;

(2) cutting a pack of shim stock pieces from an end portion of the lay-up;

(3) banding the pack transversely of its length to form a bundle; and (4) forming a plurality of kerfs extending lengthwise of the bundle from one of its ends and only partway through the bundle which kerfs are spaced apart transversely of the bundle.

2. The method defined in claim 1, including stacking random width shim stock pieces to form a substantially continuous multicourse shim stock lay-up.

3. The method of forming bundles of shims of a desired width which comprises:

stacking tapered shim stock pieces to form a substantially continuous shim stock lay-up;

consecutively cutting loose packs of shim stock pieces from an end portion of the lay-up;

banding the cutoff shim stock packs centrally between their ends to form bundles; and cutting a set of several substantially parallel kerfs in each end of each bundle extending from such bundle end into close proximity to the band.

4. The method defined in claim 3, including stacking random width shim stock pieces to form a multicourse lay-up.

5. The method defined in claim 3, including cutting off a pack from an end portion of the lay-up, shifting the lay-up lengthwise and cutting another pack from the lay-up.

6. The method defined in claim 3, including consecutively moving the bundle lengthwise partway through a gang saw, swinging the bundle end-for-end, and again moving the bundle lengthwise partway through the gang saw.

7. The method of manufacturing a bundle of shims which comprises:

forming a multicourse pack of several wood shingles tapered lengthwise of the grain with the grain of each shingle extending generally in the same direction as the grain of each of the other shingles;

banding the pack transversely of the grain to form a bundle of shingles; and forming a plurality of kerfs extending lengthwise of the grain from one end of the bundle and only partway through the bundle which kerfs are spaced apart transversely of the grain.

8. In a method of forming a bundle of shim stock pieces, the improvement which comprises stacking shim stock pieces to form a shim stock lay-up, cutting a loose pack of shim stock pieces from an end portion of the lay-up, and banding the pack transversely of its length to form a bundle.

9. In the method defined in claim 8, the improvement which further comprises stacking shim stock pieces to form a substantially continuous multicourse shim stock lay-up, consecutively cutting loose packs of shim stock pieces from an end portion of the lay-up, and banding the cutoff shim stock packs to form bundles.

10. In the method defined in claim 9, the improvement which further comprises cutting a loose pack of shim stock pieces from an end portion of the lay-up, shifting the lay-up lengthwise and cutting another pack of loose shim stock pieces from such end portion of the lay-up.

11. The method of manufacturing a bundle of shims from a pack of several wood shingles each tapered lengthwise of its grain and having its grain extending generally in the same direction as the grain of each of the other shingles, such pack having several overlapping courses of shingles and being banded transversely of the grain in the area of overlap for forming a banded shingle bundle, which comprises forming a plurality of substantially parallel kerfs extending lengthwise of a spaced apart transversely of the grain from an end of the banded shingle bundle toward but not through the shingle bundle band for forming registered kerfs in the several courses of shingles but leaving the kerfed shingle courses banded together by the shingle bundle band.

* * * * *

UNITED STATES PATENT AND TRADEMARK OFFICE

CERTIFICATE OF CORRECTION

PATENT NO. : 4,223,432

DATED : September 23, 1980

INVENTOR(S) : Charles E. Carr

It is certified that error appears in the above-identified patent and that said Letters Patent are hereby corrected as shown below:

Column 6, line 46, cancel "a" and insert ---and---.

Signed and Sealed this

*Thirteenth* Day of *January 1981*

[SEAL]

*Attest:*

SIDNEY A. DIAMOND

*Attesting Officer* *Commissioner of Patents and Trademarks*